United States Patent
Adams, Jr. et al.

(10) Patent No.: US 11,277,405 B2
(45) Date of Patent: Mar. 15, 2022

(54) DUAL BIOMETRIC AUTHENTICATION AND BIOMETRIC HEALTH MONITORING USING CHEMOSENSORY AND INTERNAL IMAGING DATA

(71) Applicant: GLOBAL E-DENTITY INC., Wilmington, DE (US)

(72) Inventors: Robert M. Adams, Jr., Nashville, TN (US); Mark Schnitzer, Dallas, TX (US); Amanda Adams, Nashville, TN (US)

(73) Assignee: GLOBAL E-DENTITY, INC., Wilmington, DE (US)

( * ) Notice: Subject to any disclaimer, the term of this patent is extended or adjusted under 35 U.S.C. 154(b) by 0 days.

(21) Appl. No.: 16/953,087

(22) Filed: Nov. 19, 2020

(65) Prior Publication Data

US 2021/0092114 A1   Mar. 25, 2021

Related U.S. Application Data

(63) Continuation of application No. 16/940,266, filed on Jul. 27, 2020, now Pat. No. 10,880,303, which is a
(Continued)

(51) Int. Cl.
*H04L 29/06* (2006.01)
*G06F 16/955* (2019.01)
(Continued)

(52) U.S. Cl.
CPC ...... *H04L 63/0861* (2013.01); *G06F 16/2365* (2019.01); *G06F 16/955* (2019.01);
(Continued)

(58) Field of Classification Search
CPC .......... H04L 63/0861; G06F 17/30371; G06F 17/30876
See application file for complete search history.

(56) References Cited

U.S. PATENT DOCUMENTS

| | | | |
|---|---|---|---|
| 5,647,364 A | 7/1997 | Schneider et al. | |
| 5,719,950 A | 2/1998 | Osten et al. | |

(Continued)

FOREIGN PATENT DOCUMENTS

| | | |
|---|---|---|
| CN | 102542281 | 2/2017 |
| EP | 1259930 B1 | 6/2005 |

(Continued)

OTHER PUBLICATIONS

Hannah, Jim, Scanning for skeletons: Anti-terror technology?, Wright State University Newsroom, Dec. 4, 2010, 3 pages, https://webapp2.wright.edu/web1/newsroom/2010/12/14/wright-state-researchers-developing-skeletal-scans-to-recognize-terrorists-2/, Beavercreek, Ohio.

*Primary Examiner* — Mahfuzur Rahman
(74) *Attorney, Agent, or Firm* — Law Office Of Dorian Cartwright; Dorian Cartwright

(57) ABSTRACT

Biometric health monitoring of a specific user or population is performed during biometric authentication for granting access to physical or digital assets. If biometric authentication, biometric verification and biometric health monitoring is acceptable, access to the physical or digital assets is allowed. Likewise, if a health anomaly is detected in a specific user or if an outbreak is detected in a specific community, an electronic notification can be sent to the individual, a health administrator, or to a government official, and access may be denied to the specific user.

13 Claims, 16 Drawing Sheets

Related U.S. Application Data continuation-in-part of application No. 16/927,915, filed on Jul. 13, 2020, which is a continuation of application No. 16/732,926, filed on Jan. 2, 2020, now Pat. No. 10,721,228, which is a continuation of application No. 16/195,677, filed on Nov. 19, 2018, now Pat. No. 10,547,611, which is a continuation of application No. 15/911,040, filed on Mar. 2, 2018, now Pat. No. 10,135,822.

(60) Provisional application No. 62/474,470, filed on Mar. 21, 2017.

(51) Int. Cl.
*G06F 16/23* (2019.01)
*G06K 9/00* (2022.01)
*G06F 21/30* (2013.01)
*G06F 21/32* (2013.01)

(52) U.S. Cl.
CPC .............. *G06F 21/30* (2013.01); *G06F 21/32* (2013.01); *G06K 9/00885* (2013.01); *G06K 9/00087* (2013.01); *G06K 2009/00932* (2013.01)

(56) References Cited

U.S. PATENT DOCUMENTS

| | | | |
|---|---|---|---|
| 5,787,185 A | 7/1998 | Clayden | |
| 5,991,408 A | 11/1999 | Pearson et al. | |
| 6,813,010 B2 | 11/2004 | Kono et al. | |
| 6,898,299 B1 | 5/2005 | Brooks | |
| 6,957,337 B1 | 10/2005 | Chainer et al. | |
| 7,370,208 B2 | 5/2008 | Levin et al. | |
| 7,526,111 B2 | 4/2009 | Miura et al. | |
| 7,631,193 B1 | 12/2009 | Hoffman | |
| 7,760,918 B2 | 7/2010 | Bezvershenko et al. | |
| 8,223,199 B2 | 7/2012 | Kiyomizu et al. | |
| 8,229,179 B2 | 7/2012 | Sato | |
| 9,224,057 B2 | 12/2015 | Bertin | |
| 9,424,456 B1 | 8/2016 | Koteshwara et al. | |
| 9,582,102 B2 | 2/2017 | Setlak | |
| 9,607,203 B1 | 3/2017 | Yazdandoost et al. | |
| 9,633,269 B2 | 4/2017 | Gu et al. | |
| 9,726,755 B2 | 8/2017 | Jack et al. | |
| 10,456,209 B2 * | 10/2019 | Peyman | G06K 9/00261 |
| 10,512,564 B2 * | 12/2019 | Rogers | A61F 7/12 |
| 2004/0202355 A1 | 10/2004 | Millhouse | |
| 2004/0236694 A1 | 11/2004 | Tattan et al. | |
| 2008/0089480 A1 * | 4/2008 | Gertner | A61N 5/1017 378/65 |
| 2008/0107309 A1 | 5/2008 | Cerni | |
| 2008/0212738 A1 * | 9/2008 | Gertner | A61N 5/1077 378/65 |
| 2010/0106475 A1 | 4/2010 | Smith | |
| 2010/0138422 A1 * | 6/2010 | Mattiuzzi | G06T 7/00 707/740 |
| 2010/0172567 A1 * | 7/2010 | Prokoski | A61B 5/418 382/132 |
| 2011/0182483 A1 * | 7/2011 | Du | G06K 9/0061 382/117 |
| 2011/0314530 A1 | 12/2011 | Donaldson | |
| 2012/0004894 A1 | 1/2012 | Butler | |
| 2014/0219521 A1 | 8/2014 | Schmitt et al. | |
| 2014/0241597 A1 | 8/2014 | Leite | |
| 2015/0199816 A1 | 7/2015 | Freeman et al. | |
| 2016/0162673 A1 | 6/2016 | Kutliroff et al. | |
| 2016/0192867 A1 | 7/2016 | Esenaliev | |
| 2017/0246473 A1 | 8/2017 | Marinkovich | |
| 2018/0168490 A1 * | 6/2018 | Jones | A61B 5/7282 |
| 2020/0126227 A1 | 4/2020 | Adiri | |
| 2020/0246179 A1 * | 8/2020 | Peyman | C12N 15/902 |

FOREIGN PATENT DOCUMENTS

| | | |
|---|---|---|
| EP | 1835438 | 9/2007 |
| JP | 2007115072 | 5/2007 |
| JP | 2003085540 | 4/2009 |
| JP | 2009093385 | 4/2009 |
| JP | 4604074 | 12/2010 |
| JP | 4767915 | 9/2011 |
| KR | 101354881 | 2/2014 |

* cited by examiner

Datapoint: 440,377,126
Datapoint: 349,425,142
Datapoint: 501,423,141
Datapoint: 354,484,161
Datapoint: 411,474,158
Datapoint: 476,474,158
Datapoint: 429,506,169
Datapoint: 338,545,182
Datapoint: 490,540,180
Datapoint: 575,532,177
Datapoint: 410,572,191
Datapoint: 565,562,187
Datapoint: 457,584,195
Datapoint: 338,600,200
Datapoint: 204,614,205
Datapoint: 560,614,205
Datapoint: 524,624,208
Datapoint: 477,634,211
Datapoint: 417,640,213
Datapoint: 367,651,217
Datapoint: 489,709,236
Datapoint: 248,681,227
Datapoint: 276,738,246
Datapoint: 459,788,263
Datapoint: 396,795,265
Datapoint: 347,796,265
Datapoint: 311,833,278

Datapoint: 394,316,105
Datapoint: 273,356,119
Datapoint: 394,369,123
Datapoint: 475,379,126
Datapoint: 386,416,139
Datapoint: 306,443,148
Datapoint: 529,450,150
Datapoint: 304,494,165
Datapoint: 387,506,169
Datapoint: 533,504,168
Datapoint: 451,522,174
Datapoint: 191,565,188
Datapoint: 300,572,191
Datapoint: 371,593,198
Datapoint: 515,603,201
Datapoint: 222,620,207
Datapoint: 306,641,214
Datapoint: 406,659,220
Datapoint: 478,683,228
Datapoint: 223,713,238
Datapoint: 489,709,236
Datapoint: 434,759,253
Datapoint: 252,786,262
Datapoint: 459,788,263
Datapoint: 396,795,265
Datapoint: 347,796,265
Datapoint: 311,833,278

DUAL BIOMETRIC AUTHENTICATION AND BIOMETRIC HEALTH MONITORING USING CHEMOSENSORY AND INTERNAL IMAGING DATA

CROSS-REFERENCE TO RELATED APPLICATIONS

This application claims the benefit as a continuation of U.S. application Ser. No. 16/940,266 by Robert M. Adams, Jr. et al., entitled REAL-TIME COVID-19 OUTBREAK IDENTIFICATION WITH NON-INVASIVE, INTERNAL IMAGING FOR DUAL BIOMETRIC AUTHENTICATION AND BIOMETRIC HEALTH MONITORING and filed Jul. 27, 2020, which is a continuation-in-part of U.S. application Ser. No. 16/927,915 by Robert M. Adams, Jr., entitled BIOMETRIC AUTHENTICATION OF INDIVIDUALS UTILIZING CHARACTERISTICS OF BONE AND BLOOD VESSEL STRUCTURES and filed Jul. 13, 2020, which claims the benefit as a continuation of U.S. application Ser. No. 16/732,926 by Robert M. Adams, Jr., entitled BIOMETRIC AUTHENTICATION OF INDIVIDUALS UTILIZING CHARACTERISTICS OF BONE AND BLOOD VESSEL STRUCTURES and filed Jan. 2, 2020, now U.S. Pat. No. 10,721,228 and issued Jul. 21, 2020, which claims priority as a continuation of U.S. application Ser. No. 16/195,677, by Robert M. Adams, Jr., entitled BIOMETRIC AUTHENTICATION OF INDIVIDUALS UTILIZING CHARACTERISTICS OF BONE AND BLOOD VESSEL STRUCTURES and filed Nov. 19, 2018, now U.S. Pat. No. 10,547,611 and issued Jan. 28, 2020, which claims priority as a continuation of U.S. application Ser. No. 15/911,040, entitled BIOMETRIC AUTHENTICATION OF INDIVIDUALS UTILIZING CHARACTERISTICS OF BONE AND BLOOD VESSEL STRUCTURES by Robert M. Adams, Jr., and filed on Mar. 2, 2018, now U.S. Pat. No. 10,135,822 and issued Nov. 20, 2018, which claims priority under 35 USC 119(e) to U.S. Prov. App. No. 62/474,470, filed Mar. 21, 2017, the content of which is being hereby incorporated by reference in its entirety.

FIELD OF THE INVENTION

The invention relates generally to computers and computer imaging, and more specifically, non-invasive, internal imaging for dual biometric authentication and biometric health monitoring for granting access utilizing unique internal characteristics of specific users.

BACKGROUND

Biometric authentication provides improved security over passwords of PINs. While the latter can be compromised and presented for access by any individual, the former makes sure that a specific individual matching the biometric data is granted access for transactions.

However, even biometric authentication has vulnerabilities that are not tolerable in high security systems. For example, fingerprints are exterior characteristics that can be lifted from doorknobs or the like and surreptitiously applied for access by the wrong individuals. Furthermore, fingerprint and iris scanning are both based on 2D scanning which limits characterization, leading to fewer points of matching to determine whether the correct individual is requesting access.

Various techniques using ultrasound can provide 3D imaging for higher granularity. However, these techniques have been implemented in large form factor devices that are not amenable to mobile smartphones or other devices that have primary functionality other than ultrasound image scanning. Another problem with current technologies using ultrasound scanning of body parts is proof of life, or in other words, there is no guarantee the object scanned is composed from human organics and is not a manufactured replica. Yet another problem is the dynamic nature of organics, including changes that can require a subject to periodically update database records used for identification.

Containment of anomalous health conditions is also an important aspect of security. The recent onset of a COVID-19 pandemic was exasperated by asymptomatic carriers unknowing access to areas unknowingly spreading infections. Sensitive areas, such as airports, public arenas, hospitals, elder care facilities, schools and the like, are vulnerable to deliberate and innocent spread of infectious disease and viruses.

Moreover, early detection of health conditions associated with a person's heart, blood and flesh or chemosensory and preventative medicine can be imperative to good health. Monitoring health typically takes place in conventional brick and mortar hospital facilities using, for example, a blood chemical test, a blood pressure reading, or other large and expensive instrumentation such as plethysmography equipment. But some individuals go months or even years without visiting such a facility. Self-monitoring can take place at home, but this is a deliberate activity that takes time and effort and is not common for individuals unaware of their health, heart and/or blood conditions. Other monitoring devices must be worn at all times and can be inconvenient.

What is needed is a robust technique for internal imaging for dual biometric authentication and biometric health monitoring utilizing unique internal characteristics, as prerequisites for granting access to facilities or resources.

SUMMARY

To address the above-mentioned shortcomings, systems, methods, and computer-readable mediums are provided for non-invasive, internal imaging for dual biometric authentication and biometric health monitoring for granting access utilizing unique internal characteristics of specific users.

In one embodiment, an access request from a specific user is received, wherein access is granted utilizing biometric authentication enhanced with non-invasive internal scanning of the body for characteristics unique to the specific user. An external light transducer device for scanning internal biometric characteristics of one or more living body parts of the specific user, scans the specific user to generate an anatomical multi-dimensional image internally unique to the specific user and to generate a biometric health profile (e.g., cardiovascular health profile) to encode internal biometric characteristics associated with the heart, flesh and blood of the specific user, responsive to the access request received.

In another embodiment, the anatomical multi-dimensional image internal to the specific user is compared to a previously stored anatomical multi-dimensional images of a plurality of users to determine any match. Also, the generated biometric health profile of the specific user is compared to a healthy baseline to determine any health anomaly (e.g., COVID-19 infection, diabetes, cancer, osteopetrosis, and the like).

In yet another embodiment, the specific user is granted access to a resource or facility responsive to matching the anatomical multi-dimensional image internal to the specific user and not identifying any health anomaly.

Advantageously, health monitoring technology is utilized to improve authentication technology. Further, contagious infections of specific individuals can be contained, and pandemic outbreaks (e.g., COVID-19) can be quickly and non-invasively identified among a population.

BRIEF DESCRIPTION OF THE FIGURES

In the following figures, like reference numbers are used to refer to like elements. Although the following figures depict various examples of the invention, the invention is not limited to the examples depicted in the figures.

DETAILED DESCRIPTION

The present invention provides methods, non-transitory computer-readable mediums, and systems for non-invasive, internal imaging for dual biometric authentication and biometric health monitoring for granting access utilizing unique internal characteristics of specific users. Cardiovascular health monitoring can include periodically checking heartbeats, blood volume, and/or blood pressure for a specific individual at different points of authentication. As a result, illnesses and diseases, can be detected and treated early for individuals and communities at large. One of ordinary skill in the art will recognize that many other scenarios are possible. For example, cardiovascular health and ultrasound (or near-infrared or light transducer) imaging is used herein for illustration purposes, but other types of health monitoring and imaging techniques known now and developed in the future can be implemented as well.

Generally, the herein-described techniques of biometric authentication of individuals utilizing characteristics of bone and/or blood vessel structures improve and interact with various electronic devices (e.g., smartphones, etc.) to provide access to secure assets. In one case, methods used for biometric authentication can be used in conjunction with other authentication methodologies employed by one or more electronic devices, such as conventional fingerprint scanning on a smartphone and/or a user PIN code to provide enhanced levels of identity authentication.

In some instances, the biometric authentication technology can be used to enhance other security provision technologies. For example, the instant techniques may be implemented in a unique collaborative methodology with a gun vault in order to provide access to the secure asset (e.g., a rifle). In another example, the instant techniques may be implemented in a unique collaborative methodology with computer software authentication to enhance login credentials for an online bank account login (as well as other high security access systems).

Biometric health monitoring, in one case, is implemented as a stand-alone application apart from biometric authentication and biometric verification. In another case, biometric monitoring is bundled with other biometric services.

I. Point of Authentication, Point of Verification and Point of Health Monitoring with Multi-Dimensional Internal Imaging (FIGS. 1A-1C)

Figure 1A:
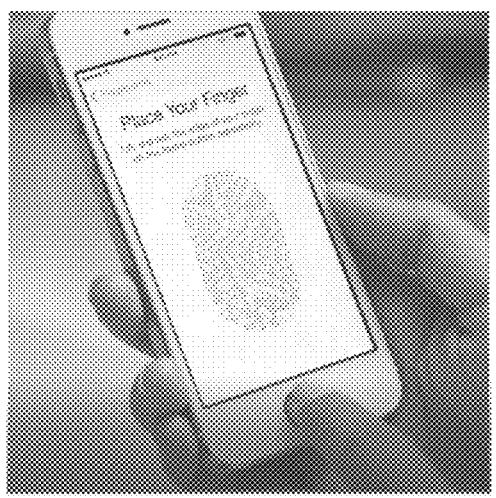
FIGS. 1A-1C illustrate various examples of points of authentication, points of verification and points of monitoring for 3D internal scanning from a finger, according to some embodiments.
Figure 1B:
Figure 1C:
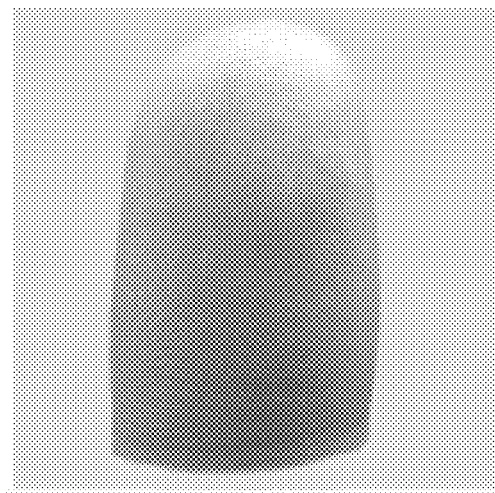

FIGS. 1A-1C illustrate examples of point of authentication for 3D internal scanning from a finger, according to some embodiments. Scanning may also include other multi-dimensional scanning, such as 2D and a 2D scanning enhancement technology to emulate 3D, and other internal biometric scanning (e.g., blood composition, blood volume, heartbeat, and blood pressure). The techniques described herein can be implemented from points of authentication, including smartphone apps, ATM machines and other financial transactions, replacing all credit cards and known ID's, door or gate access, home locks, automobile engine starters, sales transactions, gun triggers, government functions, REAL ID Act replacement, Immigration ID passport replacement, fraud prevention, full body scanners, and any other context requiring confirmation of a specific individual for transaction. One implementation scans subjects (human or non-human) in motion as they walk through a security screening area (such as that at a TSA (Transportation Security Administration) security check point or other.

In some embodiments, health trends are identified from cardiovascular biometrics scanning of many people over many locations. In more detail, cloud-based artificial intelligence can detect changes in blood composition to certain locations and certain times. For example, an outbreak of bird flu in general population can be quickly isolated from changes in blood composition for people arriving at airports from a common departure city. In another example, onset of cancer in a specific individual is determined by increased levels of certain aspects in blood composition. On a first level of analysis, health anomalies can be identified by an average level of blood composition reaching a certain level. On a second level of analysis, health anomalies can be identified from the average change in blood composition levels for individuals. Because individual's are being identified during monitoring, changes over time can also be monitored. Returning to the example, an individual's blood composition upon arrival to a location and a change upon leaving that location, when compared to changes among other individuals at the same location, can detect an early break out of disease, virus, or other illness. In some embodiments, artificial intelligence uses baseline health data, real-time health data, in combination with predictive modeling and graphing to make detections. Specific individuals, hospitals and government authorities may be notified as a result.

To gather health information at the point of authentication, a finger, hand, portion of the body, or full body is scanned for multi-dimensional anatomical internal imaging (e.g., 3D imaging). In response, a back-end computer system compares anatomical images to stored anatomical images for identifying a match, as described in more detail below. If a successful match is returned, the point of authentication can continue in performing requested actions or processing. In some embodiments, additional points of authentication may be utilized for full authentication and/or verification of a subject, such as proof of life (for both humans and non-humans) and blood analysis. Proof of life prevents prosthetic limbs or other man-made objects from causing false positive authentications.

The point of authentication includes a scanning engine which performs the multi-dimensional internal scanning for a subject. The scanning engine may operate in any frequency range, including for example in the kilohertz or terahertz frequency ranges. The scanning engine can be any other type of biometric scanner for individuals. A cardiovascular scanner can determine heartbeat, blood volume and blood pressure parameters during authentication scanning. Examples of this implementation can be seen in later FIGS. 5A and 5B with scanning engines 515A and 515B respectively.

II. Generating and Matching Vertice Profiles of Bones and/or Blood Vessels (FIGS. 2A-5C)

Figure 2A:
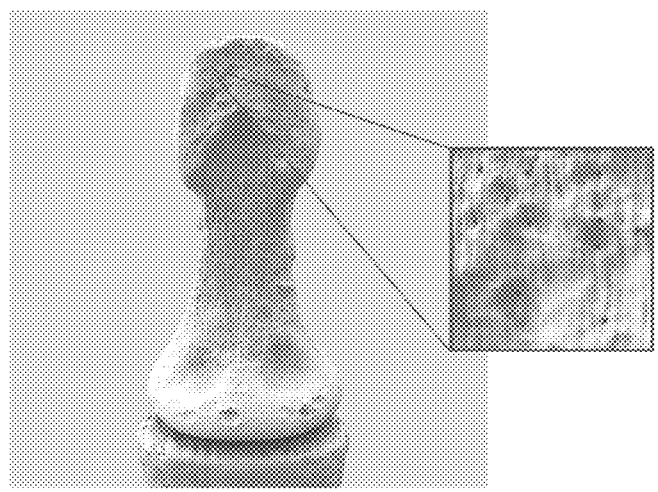
FIGS. 2A-2C illustrates steps of generating a vertice profile from a scan of a finger bone at a point of authentication, according to some embodiments.
Figure 2B:
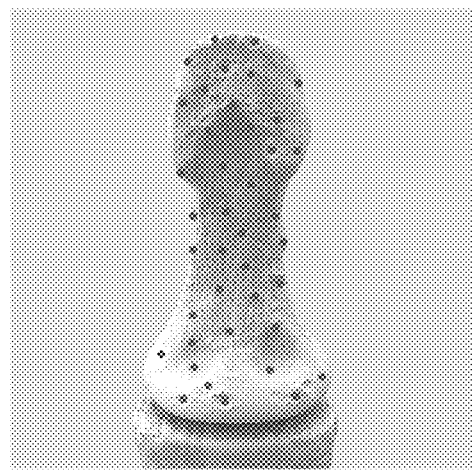
Figure 2C:
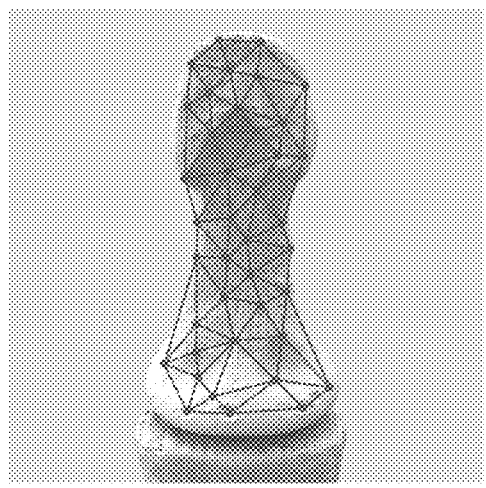

FIGS. 2A-2C illustrates steps for generating vertice profiles from an anatomical ultrasound image of bones, according to some embodiments. The multi-dimensional image reveals unique characteristics of bones and blood vessels with a high degree of granularity. For example, hundreds or thousands of localized divots and peaks can be identified in a finger scan represented by spatial coordinates. This can be seen in FIG. 2A where a zoomed in image shows a plurality of prospective divots and peaks for a finger. The scan is analyzed by a processor (e.g., a vertice generation engine as shown in FIG. 5B) to find each individual marker that matches a profile, for example, by recognizing divots and peaks of the scan having a certain size and or position. Many other criteria can be implemented for identifying unique aspects of scans.

Next, relative locations of each unique characteristic are marked and vertices are identified. FIG. 2B illustrates a marking of the confirmed plurality of divots and peaks throughout the entire bone structure which have been scanned. This is performed for a localized dataset (e.g., a portion) of the 3D image in an iterative basis until the entire image is marked. The determination of the divots and peaks may be accomplished by applying the anatomical multi-dimensional image to a pre-determined dataset having specific properties with allowable variance for qualification of divots and peaks. For example, divots can be quantified with respect to depth below a bone surface and peaks can be quantified with respect to height above a bone surface. Shape or geometric constraints and other characteristics can also be analyzed. Subsequently, location coordinates of the identified plurality of divots and peaks, or vector maps, can be extracted for the generation of the vertice profile. The vectors represent the relative distance between the 3D coordinates, regardless of absolute value of the 3D coordinates. This is illustrated in FIG. 2C where the divots and peaks of the finger are analyzed through a vector mapping and a profile is visually illustrated which has been generated from the locations of the divots and peaks. As a result, a digital vertice profile of the image is generated from the vector mapping. The vertice profile includes a set of relative 3D coordinates.

The vertice profiles can be represented graphically or through data points (e.g., hundreds or thousands of 3D coordinates). The vertice profile can differ from among different scanning images, due to positioning, camera resolution, scanning surface, and many other factors. The vertices may be stored by the authentication server or another suitable system component.

In some embodiments, an optional technique ensures proof of life, or in other words, that a living human or a living non-human (e.g., animal or other species) appendage is being used for authentication. In some embodiments, a living human or non-human appendage can be interpreted as any organic living biological entity, organic human or non-human data, muscle tissue, human or non-human organs, and the like. More specifically, a thermal profile or laser/luminance (color signature) component validates thermal characteristics or color signatures within a range of live human or non-human data. This prevents prosthesis from being used to replicate a subject. In some embodiments, a thermal data transmission is received by the authentication server. The thermal data transmission includes thermal characteristics such as heat values corresponding with specific coordinates of the live/human or non-human appendage, temperature maps corresponding with specific coordinates of the live/human or non-human appendage, and similar thermal characteristics. A thermal profile is generated from one of the thermal characteristics and/or relative disparities of the thermal characteristics from the thermal data transmission. The thermal profile may be a dataset of thermal properties relative to localized coordinates of the live human or non-human appendage. The thermal profile is then compared against a database stored thermal profile. The database stored thermal profile contains the verified biometric information of the subject which is stored electronically in a database. A comparison is conducted between the thermal profile and the database stored thermal profile, where a disparity is allowed within a pre-defined accuracy threshold. An example of this implementation can be seen in FIG. 8.

In an optional embodiment, a cardiovascular profile is embedded with the vertice profile for storage. However, the cardiovascular profile can be used as an input to authentication algorithms in some cases. For instance, a snapshot of an individual's blood composition can be encoded as a key used to lock an asset, and then used as a key to unlock an asset. In another instance, an individual's ethnicity or race can be determined from biometric scanning and used as a parameter for access to the individual's protected asset.

Figure 3A:
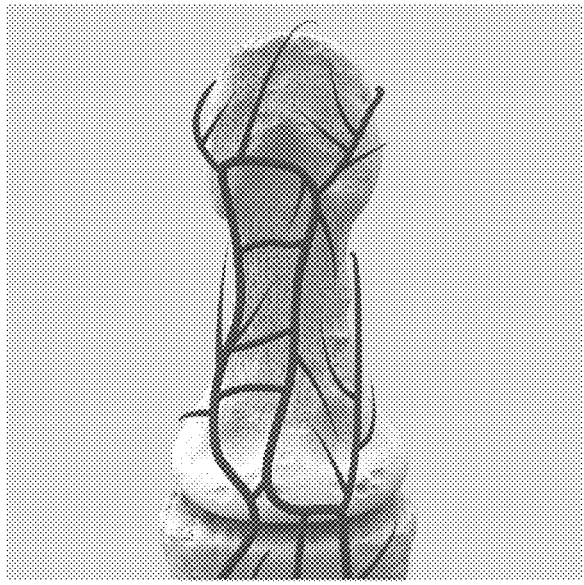
FIGS. 3A-3B illustrate steps of generating a vertice profile from a scan of blood vessels of a finger at a point of authentication, according to some embodiments.
Figure 3B:
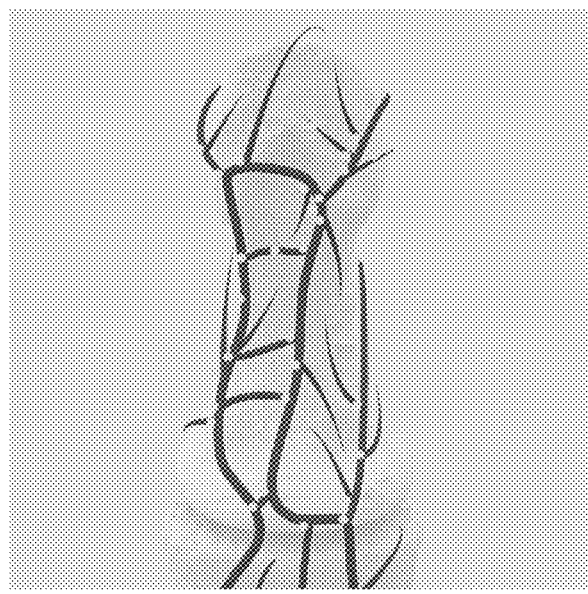

FIGS. 3A-3B illustrate steps of generating vertices from a scanned anatomical image of blood vessels according to some embodiments. The technique for generating vertice profiles for blood vessels can be similar to that of generating vertice profiles from bone structures. FIG. 3A represents the blood vessel geometry which is identified by mapping the blood vessel structure through a series of 3D coordinates. In some embodiments, unique characteristics differ between bones and blood vessels. For instance, markers can be located at branch points of blood vessels. These branch points can be seen as the indicated dots (e.g., markers) in FIG. 3B. A blood vessel branch may be considered as an intersection (or wye) between two distinct blood vessel paths. In similar fashion to FIG. 2C in the above example, the blood vessel geometry may be represented as vector mapping, wherein the vector mapping represents the relative distance between the branch points. In some embodiments, temperature, laser/luminance (color signature) and bone density profiles can enhance information. Data can be secured with block chain technology or other techniques.

Figure 4A:
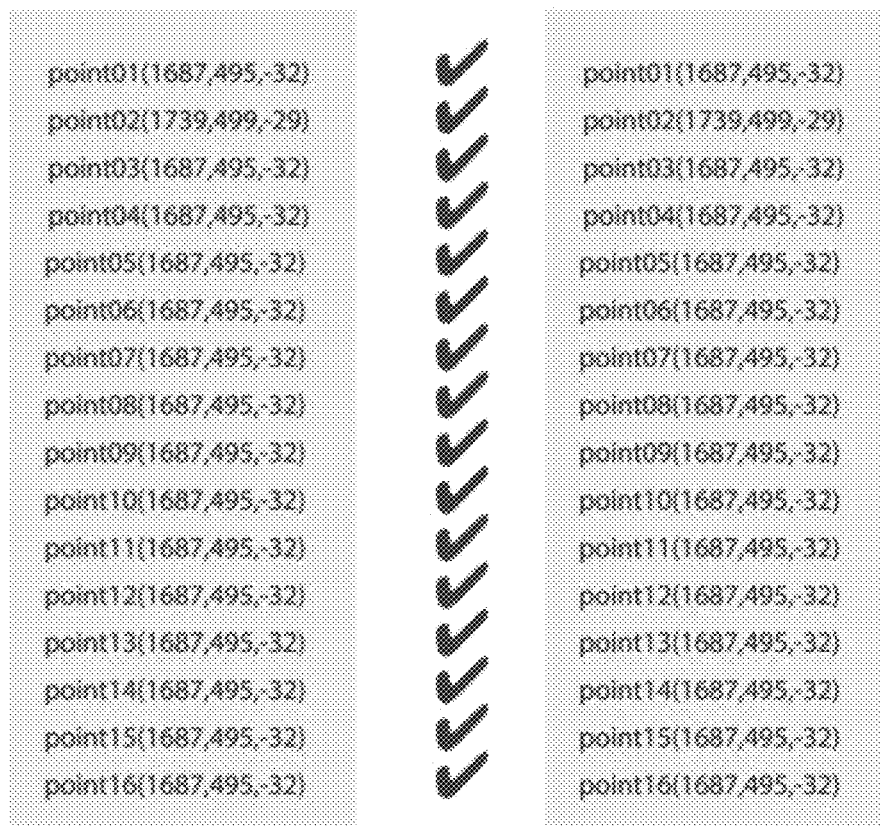
FIG. 4A illustrates a dataset matching for vertice profiles between a database and a secure access asset requesting authentication, according to an embodiment.
Figure 4B:
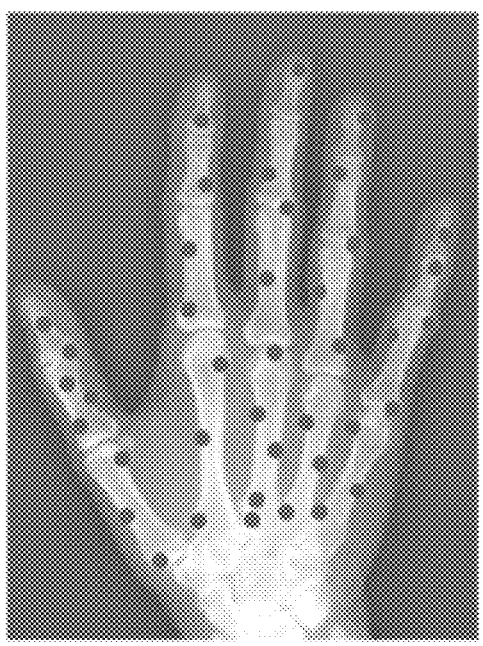
FIG. 4B illustrates generation of a plurality of data points for a bone structure of a hand from an anatomical multi-dimensional image, according to an embodiment.
Figure 4C:
FIG. 4C illustrates generation of a plurality of data points for a blood vessel structure of a hand from an anatomical multi-dimensional image, according to an embodiment.

Continuing from the example of FIG. 2A-C and FIG. 3A-B, FIG. 4A illustrates a comparison of data points from scanned data points of the finger as compared to a vertice profile for the finger stored in a server. In this example, coordinates are generated for marker and/or vertices of vertice profiles. Some cases involve additional characteristics data associated with the data points such a temperature, color and other analytical data. Separate examples are provided illustrating data points for scanned data points of different anatomical image scans. For example, FIG. 4B illustrates a bone scan of a full hand scan. The left side of the figure illustrates the graphic of the hand which includes a plurality of points, whereas the right side of the figure illustrates a list of data points which correspond to the graphic of the hand. Similarly, FIG. 4C illustrates a blood vessel scan of a full hand scan. The left side of the figure illustrates the graphic of the hand which includes a plurality of points depicting the branch points of the blood vessel data points visually, whereas the right side of the figure illustrates a list of data points which correspond to the graphic of the hand.

A local or remote database of vertice profiles is accessed for comparison of an instant vertice profile. Levels of tolerance based on a pre-determined threshold for matching may be implementation specific. For example, a high security context (e.g., financial transaction) can have tighter tolerances than a minimum-security context (e.g., log-in to e-mail). Once a match is identified, a successful authentication message can be output and access granted. A pre-determined threshold may be set by the system administrator, a third-party authentication services, or a subject of the authentication services.

In some embodiments, matching vertice profiles are associated with a particular subject account storing permissions or policies. The permissions may allow a subject immediate access while other permissions require additional verifications. Further, some subjects are granted deeper access than others (e.g., administrator access versus guest access).

Figure 3C:
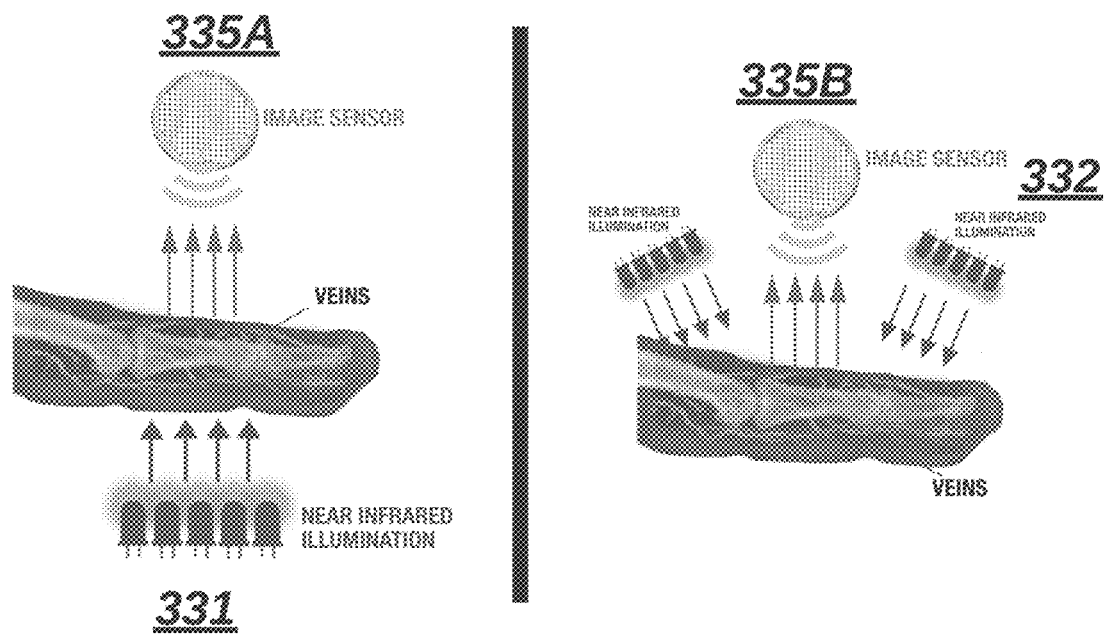
FIGS. 3C-3D illustrate scanning process and scan results for biometric health monitoring with near infrared illumination of veins for an image sensor, according to embodiments.
Figure 3D:
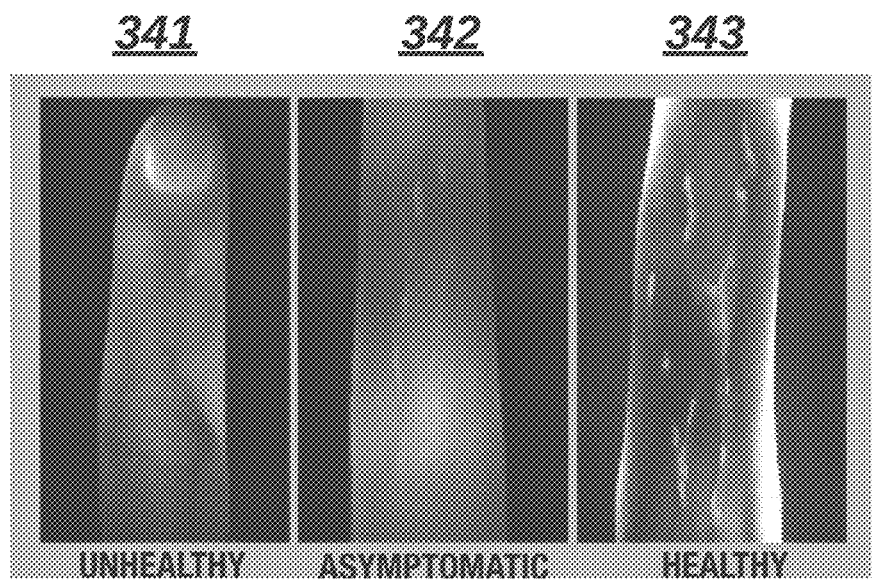

Other embodiments generate biometric health profiles such as cardiovascular profiles for an individual, during authentication scans, as is described further in the following section. The scanning process is shown in FIG. 3C with near infrared illumination 330A and 330B of veins from the bottom 331 and top 332 for capture by image sensors 335A and 335B. The scanning results are shown in FIG. 3D which demonstrates a healthy scan 341, an asymptomatic COVID-19 scan 342, and an unhealthy COVID-19 scan 343. As a result, access could be denied to sensitive areas to prevent infections to others.

III. Systems for Dual Biometric Authentication and Biometric Health Monitoring for Grating Access (FIGS. 5A-5C)

Figure 5A:
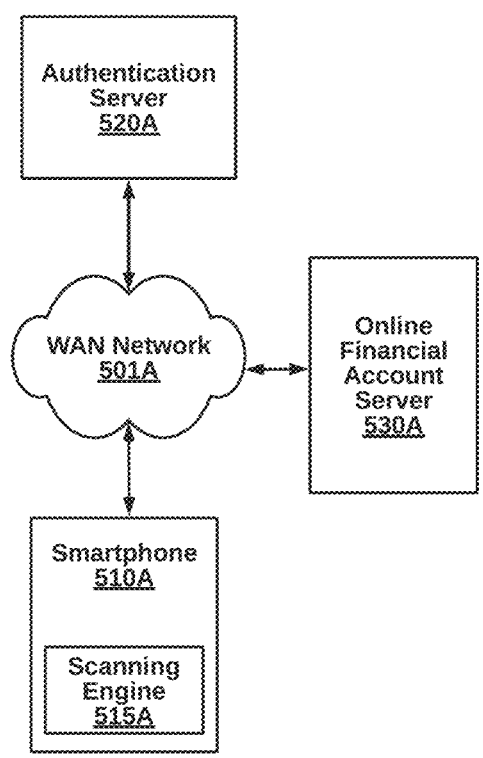
FIGS. 5A-5B are high-level block diagrams illustrating systems for biometric monitoring during biometric authentication and verification of individuals using bone and/or blood vessel 3D internal imaging, according to some embodiments.
Figure 5B:
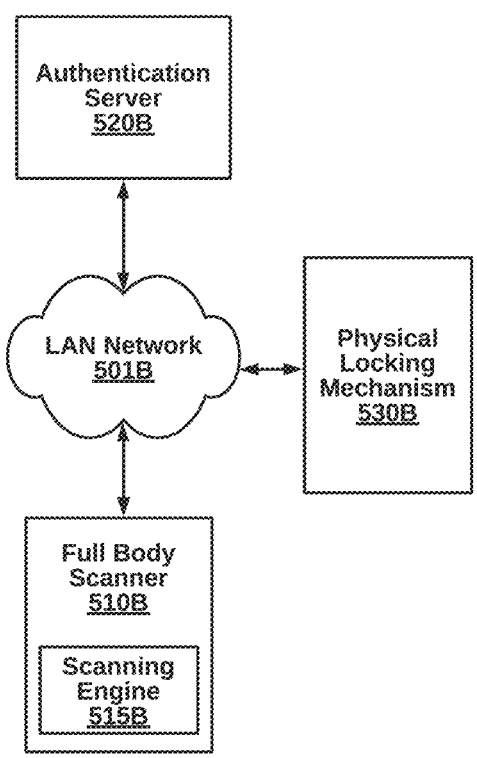
Figure 5C:
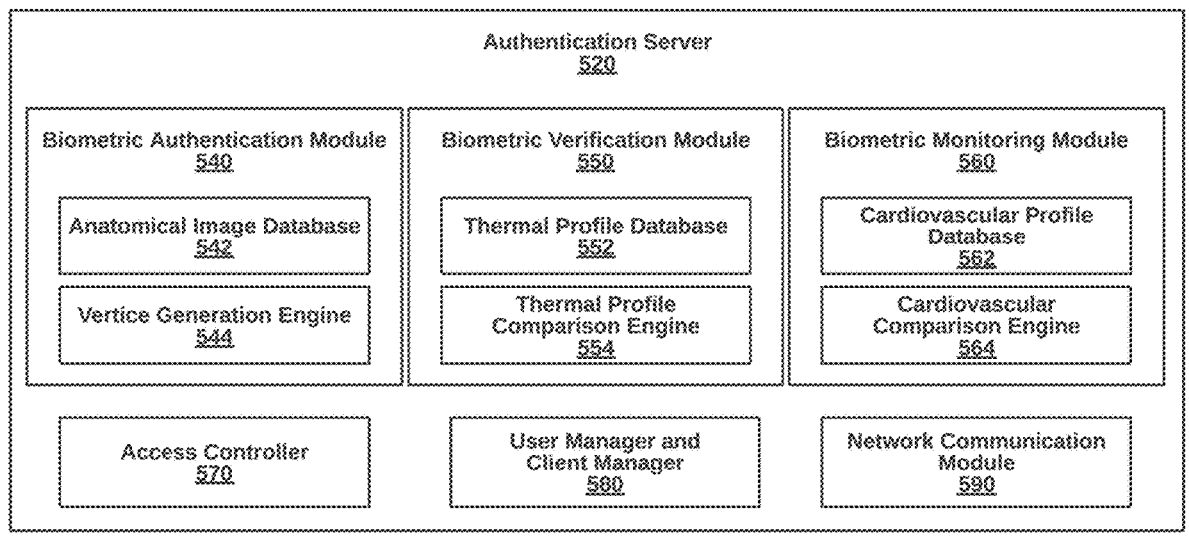
FIG. 5C is a more detailed block diagram illustrating the authentication server of the systems of FIGS. 5A-5B, according to one embodiment.

FIG. 5A is a high-level block diagram illustrating a systems 500A and 500B for biometric monitoring during biometric authentication of individuals using bone and/or blood vessel structure 3D imaging over a wide area network (WAN) for logging on to an online financial account server using a smartphone, according to one embodiment. The system 500A can include a smartphone 510A coupled to an authentication server 520A through a WAN network 501A. The secure access asset is an online financial account server 530A. Other system implementations are localized rather than distributed. Preferably, some embodiments of the system 500A is configured to provide real-time authentications. Other embodiments authenticate locally at the smartphone 510A without any, or just limited, transactions over a network to the authentication server 520A. Also, the smartphone 510A can be any mobile or stationary processor-driven device, such a full system of computers at a TSA check point.

In similar configuration, FIG. 5B is a high-level block diagram similar to FIG. 5A, with the utility of allowing a full body scanner to be used to access a physical locking mechanism on a local area network (LAN). A full body scanner 510B serves as the point of authentication which allows for a subject to 3D scan their full body for bone and/or blood vessel structures. The scanning engine 515B provides for the full body scanning capacity of the subject to be sent, through the LAN network 501B, to the authentication server 520B. The secure access asset of the present embodiment is a physical locking mechanism 530B.

The scanning engines 515A, 515B quickly measure hundreds or thousands of points of unseen bone and blood vessel structures. In some embodiments, the scanning engines 515A, 515B also measure cardiovascular levels associated with blood, blood volume, blood pressure, blood composition, heartbeats, and the like. The scanning engines 515A, 515B can be one or more small form factor ultrasound scanning devices, or other type of scanning devices, integrated completely with the smartphones 510A, 510B, or plugged into or connected via Bluetooth or the like. One embodiment also includes a light transducer (e.g., a 6.5 kHz, 30V, 350 Ohm piezo electric transducer made of brass and having wire terminals, by Digi-Key Electronics of Thief River Falls, Minn.) operating at various frequencies to enhance the resolution of image capture during non-invasive scans. For example, transducer illumination can be combined with 100-300 MHz or Terahertz scan frequencies. The light source in the transducer illuminates a body part and, upon reflection of the light, detects changes in light intensity caused by pulsatile variations in blood volume. Different frequencies capture different biometric information. The light transducer is dynamically tuned to a particular subject in one instance. The scanning engines 515A, 515B can be hardware devices, and optionally include software components (e.g., low level optimized microcode or high-level algorithms). Another scanner can be a CMUT (capacitive micromachined ultrasonic transducer) ultrasound for smaller form factor and higher quality internal imaging. Still another implementation uses an infrared light transducer.

The authentication servers 520A, 520B on the cloud can host powerful biometric authentication algorithms, biometric verification algorithms, and biometric monitoring algorithms, as described in more detail with respect to FIG. 5C. When anomalies for cardiovascular health are detected from scanning, a notification can be sent out in conjunction the access grant or notification can be made separately. Anomalies can be with respect to a baseline of general population or to a baseline of an individual. For example, blood pressure can be determined as high for any individual, or it can be determined as unusually high for a particular individual typically having low blood pressure.

Other embodiments include algorithms to predict changes over time in bone or blood vessel structure due to degenerative diseases, age, an individual's change in health over time, and other factors that result in structure alterations. A baseline image used for comparison can be updated with a current version taken from a point of authentication for future comparisons rather than requiring users to re-enroll baseline images. Still another embodiment provides poof of life verification by confirming that a scanned body part is from a living human or non-human. Yet another embodiment spot checks an individual's current cardiovascular health relative to a baseline.

A secure access asset (e.g., online financial server 530A, and physical locking mechanism 530B) can be any type of asset or system which requires authentication from the systems 500A and 500B, physical or digital/virtual. For example, a door lock or networked rifle case which requires biometric authentication may be physical secure access assets. In other examples, online bank accounts or cryptocurrency wallets, and credit cards may be digital/virtual secure access assets. Other examples perform biometric authentication and biometric monitoring during log in to a remote doctor appointment by video over a network. The secure access assets interface with the authentication server and point of authentication through a network interface over the network. After authentication, an electronic lock nearby a user can be remotely unlatched, a grant access command can be sent over a network to a remote online account, or local data can be unleashed from point of authentication itself. Many other actions are possible once authentication has been completed.

FIG. 5C is a more detailed block diagram illustrating the detailed operations of the authentication server 520 (generically representing authentication servers 520A and 520B of FIGS. 5A and 5B), according to one embodiment. The authentication server 520 comprises a biometric authentication module 540, a biometric verification module 550, and a biometric monitoring module 560. In other embodiments, verification and monitoring are performed by dedicated servers in network communication with the authentication server 520.

The biometric authentication module 540 further comprises n anatomical image database 542 stores 3D images and/or vertice profiles saved when users enroll. For example, a subject may be required to scan their finger for enrollment using the system by placing their finger at the scanning engine component of the point of authentication in the same manner as subsequent scans used for access. In other embodiments, pre-existing vertice profiles may be loaded by third party services, whereby the subject being authenticated may provide pre-authorization to use the pre-existing vertice profiles. In some embodiments, the anatomical image database 542 and others are remote third-party services.

A vertice generation engine 544 generates vertice profiles from the point of authentication utilizing multi-dimensional images. As described earlier, and as illustrated in FIGS. 2A-C and 3A-B, the vertice generation recognizes divots and peaks of the scan having a certain size and or position. This is saved in a vertice profile as a set of data points. In some embodiments, the set of data points may be represented as vectors. The vertice generation engine 544 then takes the generated vertice profile and compares it against a stored vertice profile from the anatomical image database 542 and determines whether it meets a pre-determined threshold. In some embodiments, the vertice generation engine 544 takes additional characteristics into account for comparison such as temperature and color. In some embodiments, the vertice generation engine 544 may be situated local on the point of authentication (e.g., smartphone).

The biometric verification module 550 further comprises a thermal profile database 552 to store proof of life parameters and images used during verification through comparisons by the thermal provide comparison engine 554. In some implementation, biometric monitoring information also lends to the proof of life analysis.

The biometric monitoring module 560 further comprises a cardiovascular profile database 562 to store cardiovascular parameters and images detection of conditions by the cardiovascular comparison engine 564. Comparisons can be made against a general population, a subset of population (e.g., subset of location or time) or against an individual history. In other embodiments, a health profile database is included for more general monitoring. The database can include records for multiple users created during registration. Medical data can be uploaded from a doctor's office. For community baselines, established ranges can be set, or data collected over a period of time issued. Other data can include baseline medical information for different demographics, for instance, age, gender, race, and habits (e.g., smoking or drinking). To identify health anomalies, markers for normal health (or markers for abnormal health) can be compared against a real-time scan. For example, a low amount of hemoglobin can be an indicator of low oxygen intake due to COVID-19 or other coronavirus (see FIG. 3E), or other ills. A combination of markers serves as a fingerprint. In yet another embodiment, chemosensory data for smell is compared against normal baselines for identification of anomalous health conditions.

The access controller 570 determines whether conditions have been met for access. Log in credential or digital keys can be stored by the authentication server 520 and sent across a network to open access to a hard or soft asset.

The user manager and client manager 580 manage individual user accounts and connections to points of authorization. An individual can have specific health thresholds based on specific conditions of the individual. Additionally, historical scan information can be stored for identification of changes in blood composition for an individual. In some implementations, each point of authorization (or point of verification or point of monitoring) is registered with the user manager and client manager 580 to establish security and APIs (application programming interfaces) for higher level communications between applications and operating systems of remotely connected devices.

The networking communication module 590 contains all necessary hardware and software required for operating a network under a wired or wireless network operating under IEEE 802.11-type protocols, but can also be a hybrid network including some wired components. This allows for the authentication server to be networked to the network, the secure access asset, and the point of authentication (e.g., smartphone, full body scanner, and the like).

IV. Methods for Dual Biometric Authentication and Biometric Health Monitoring for Grating Access (FIGS. 6-7)

Figure 6:
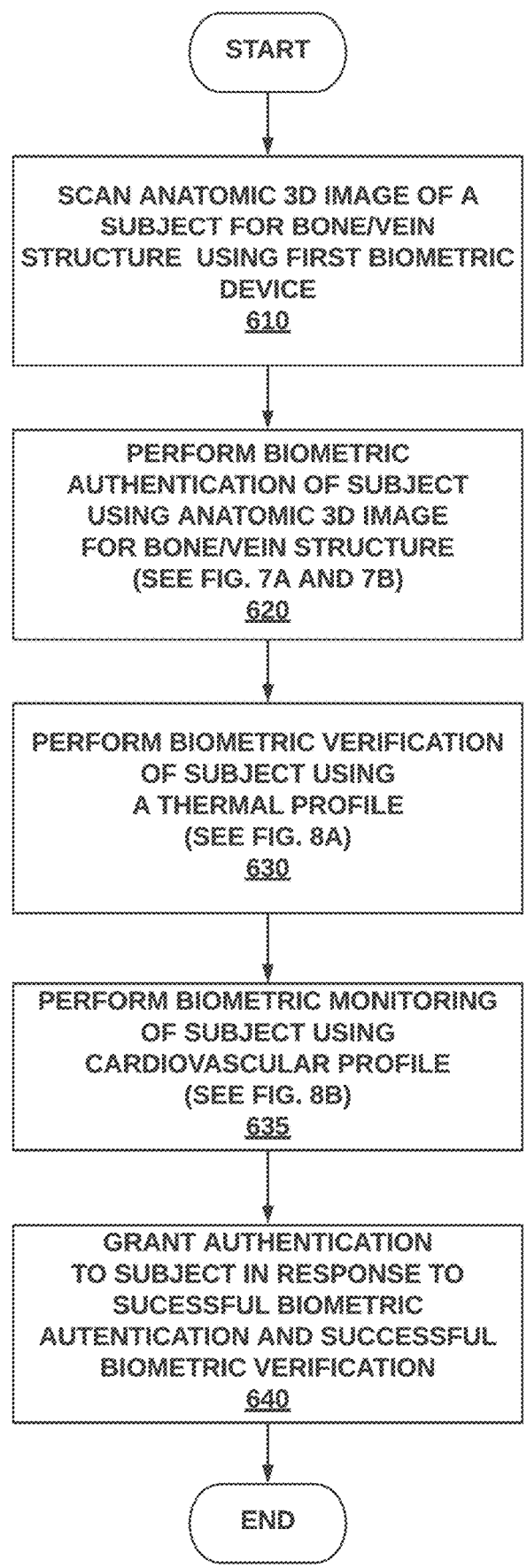
FIG. 6 is a high-level block diagram illustrating a method for performing biometric authentication and biometric health monitoring to grant access based on an anatomic multi-dimensional image, according to one embodiment.

FIG. 6 is a high-level block diagram illustrating a method for performing dual biometric authentication and biometric health monitoring for granting access based on an anatomic multi-dimensional image. The method 600 can be implemented by any of the systems 500A and 500B of FIGS. 5A and 5B. One of ordinary skill in the art will recognize variability in the grouping of steps and order of execution, within the spirit of the present disclosure.

At step 610, an anatomic 3D image scan of a subject for unique internal characteristics, for example, bone and/or blood vessel structure using first biometric device is performed by a first biometric device. Organs within an individual can also be scanned. At step 620, biometric authentication of subject using anatomic 3D image for bone and/or blood vessel is performed. Various implementations are discussed in further detail in FIG. 7A.

At step 630, biometric verification is performed of the subject using a thermal profile. Various implementations are discussed in further detail in FIG. 8. At step 635, biometric monitoring of a subject is performed using a cardiovascular health profile of the individual. More general health profiles can be used as well. In an embodiment, health monitoring profiles for specific individuals are compared against previously stored health monitoring profiles as records in a database. Heath anomalies of specific individuals can also be part of authentication. In another embodiment, health monitoring profiles for specific individuals are compared against a community at-large or compared to expected levels of similar individuals (e.g., according to age, gender, race or weight).

At step 640, access is granted to the subject in response to successful biometric verification and successful biometric verification. Access can be to a physical, brick and mortar asset such as hospital or clean room. Access can also be to a digital asset, such as a bank account or smart phone.

Figure 7A:
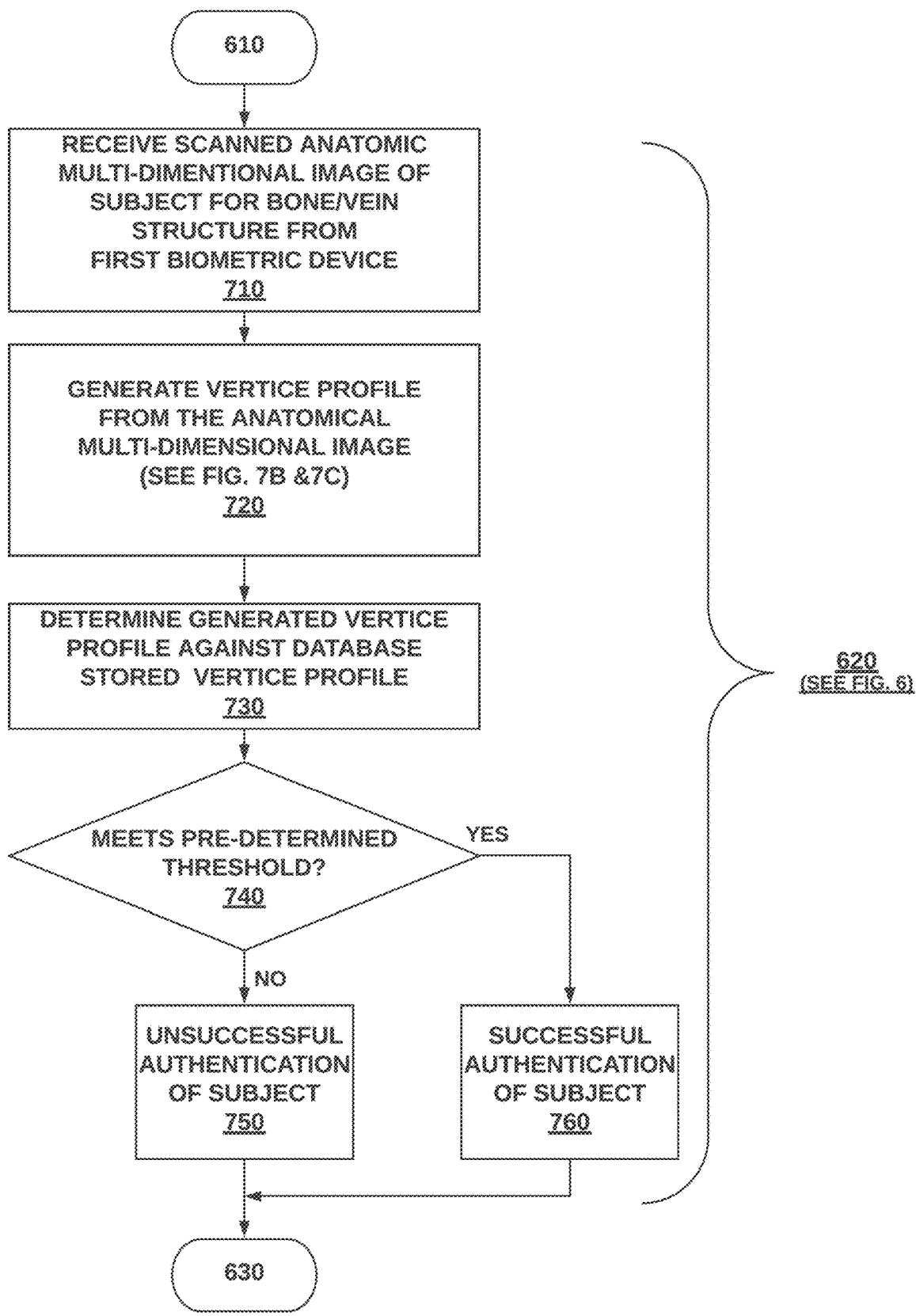
FIG. 7A is a more detailed block diagram illustrating a method for performing biometric authentication of a subject using an anatomic 3D image using bone and/or blood vessel multi-dimensional imaging, according to one embodiment.

FIG. 7A is a more detailed block diagram of FIG. 6 illustrating a method for performing biometric authentication of a subject using an anatomic 3D image using bone and/or blood vessel multi-dimensional imaging, according to one embodiment. At step 710, scanned anatomic 3D images for bone structures are received from a biometric device. At step 720 vertice profiles are generated from the anatomical 3D images. Various implementations of vertice generation based on bone structure can be found in FIG. 7B (similarly for blood vessel structures in FIG. 7C). Various implementations of vertice generation based on bone structure can be found in FIG. 7C. The anatomical 3D image includes a plurality of relative locations of divots and peaks localized to the bone structure. At step 730, the generated vertice profiles are compared against a database of vertice profiles. In response to meeting a pre-defined threshold at step 740, authentication is deemed successful to the subject at step 760. Otherwise, an indication of unsuccessful authentication is found at step 750.

Figure 7B:
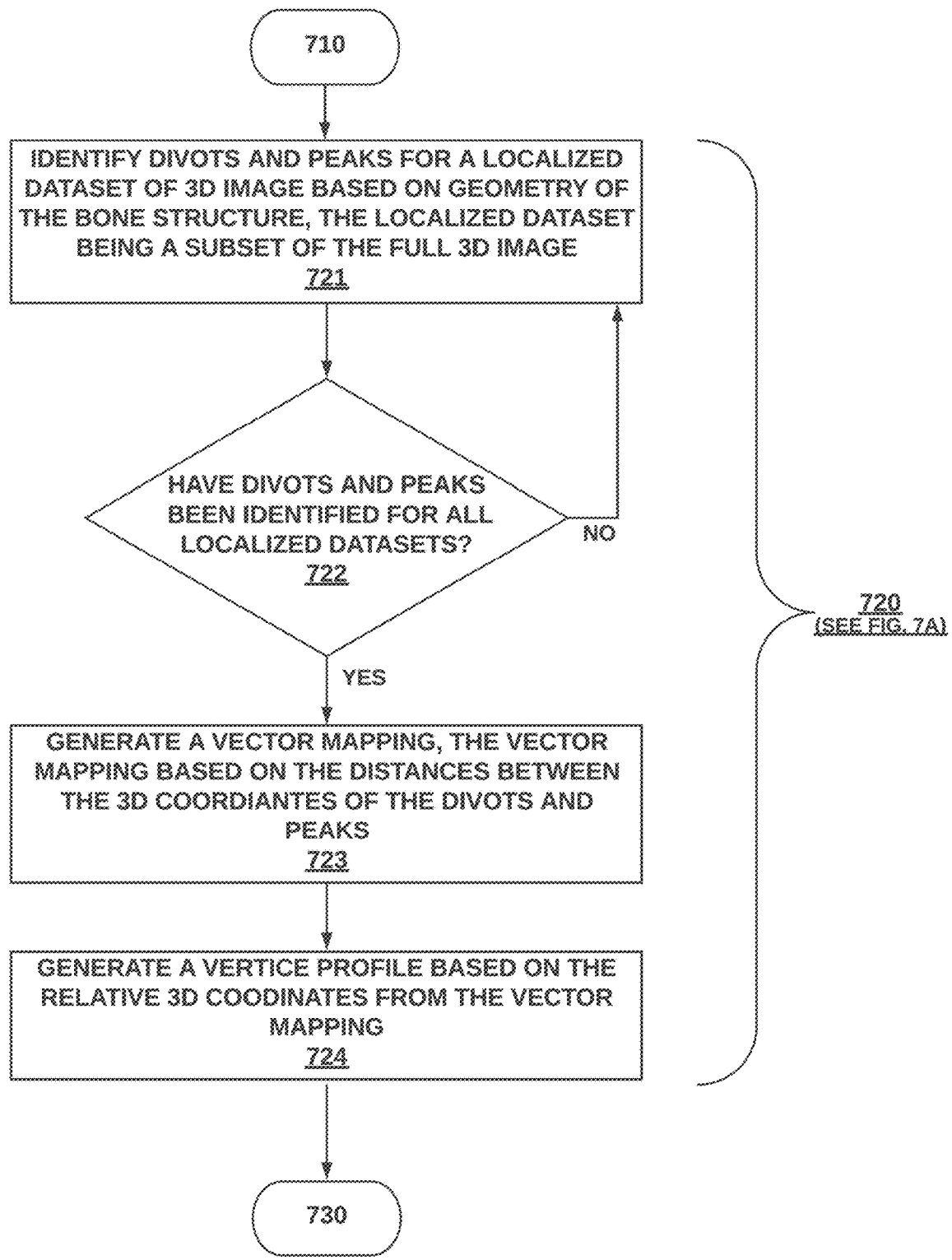
FIG. 7B is a more detailed block diagram further detailing the step of generating a vertice profile from the anatomic multi-dimensional image from a bone structure, according to one embodiment.

FIG. 7B is a more detailed block diagram further detailing the step of generating a vertice profile from the anatomic multi-dimensional image from a bone structure, according to one embodiment. At step 721, divots and peaks are identified for a localized dataset of the 3D image based on geometry of the bone structure. The localized dataset is a subset of the full 3D image. At step 722, the above step of 721 continues until all divots and peaks for localized datasets have been identified. At step 723, a vector mapping is generated based on the distances between the 3D coordinates of the divots and peaks. At step 724, a vertice profile is generated based on the relative 3D coordinates from the vector mapping.

Figure 7C:
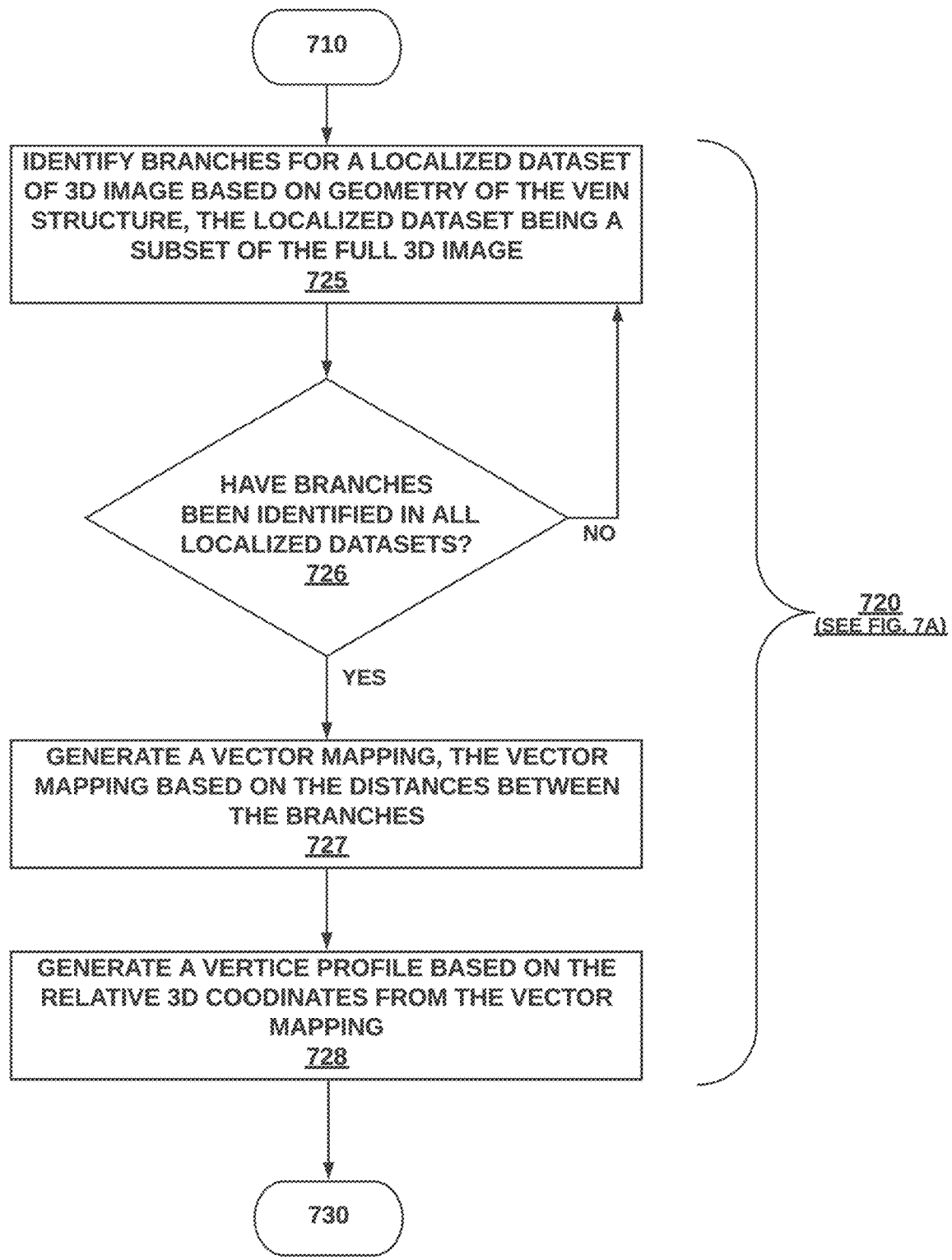
FIG. 7C is a more detailed block diagram further detailing the step of generating a vertice profile from the anatomic multi-dimensional image from a blood vessel structure, according to one embodiment.

FIG. 7C is a more detailed block diagram further detailing the step of generating a vertice profile from the anatomic multi-dimensional image from a blood vessel structure, according to one embodiment. At step 725, branches are identified for a localized dataset of the 3D image based on geometry of the blood vessel structure. The localized database is a subset of the full 3D image. At step 726, the above step of 721 continues until all branches for localized datasets have been identified. At step 727, a vector mapping is generated based on the distances between the 3D coordinates of the branches. At step 728, a vertice profile is generated based on the relative 3D coordinates from the vector mapping.

Figure 8A:
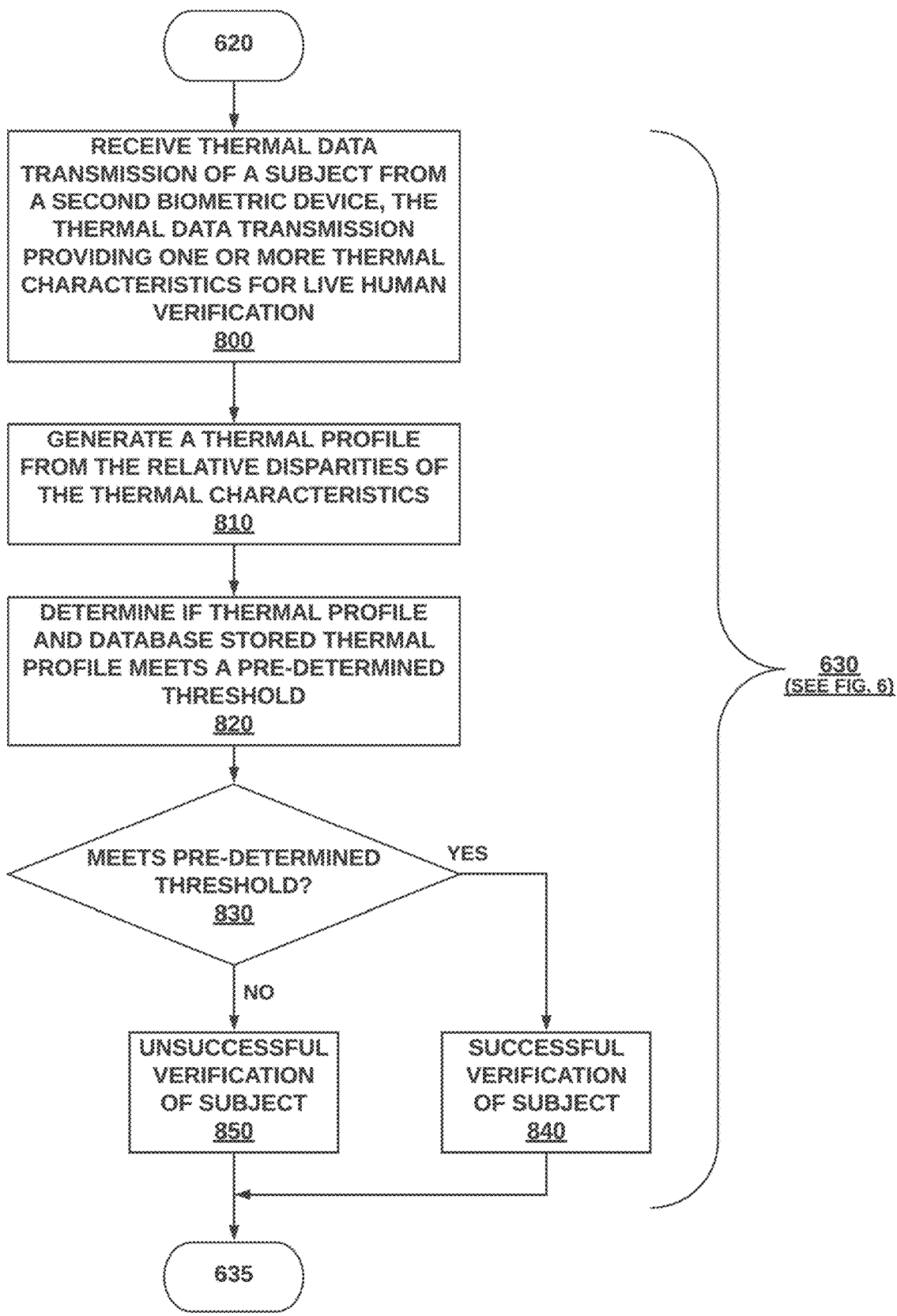
FIG. 8A is a more detailed block diagram illustrating a method for performing biometric verification of a subject using a thermal profile during biometric authentication, according to one embodiment.

FIG. 8A is a more detailed block diagram illustrating a method for performing biometric verification of a subject using a thermal profile, according to one embodiment. At step 800, a thermal data transmission of a subject is received from a second biometric device. The thermal data transmission provides one or more thermal characteristics for live human or live non-human identification. At step 810, a thermal profile is generated from the relative disparities of the thermal characteristics. At step 820, a determination is made as to whether the thermal profile and database stored thermal profile meets a pre-determined threshold of accuracy. In response to meeting a pre-defined threshold at step 830, authentication is deemed successful to the subject at step 840. Otherwise, an indication of unsuccessful authentication is found at step 850.

Figure 8B:
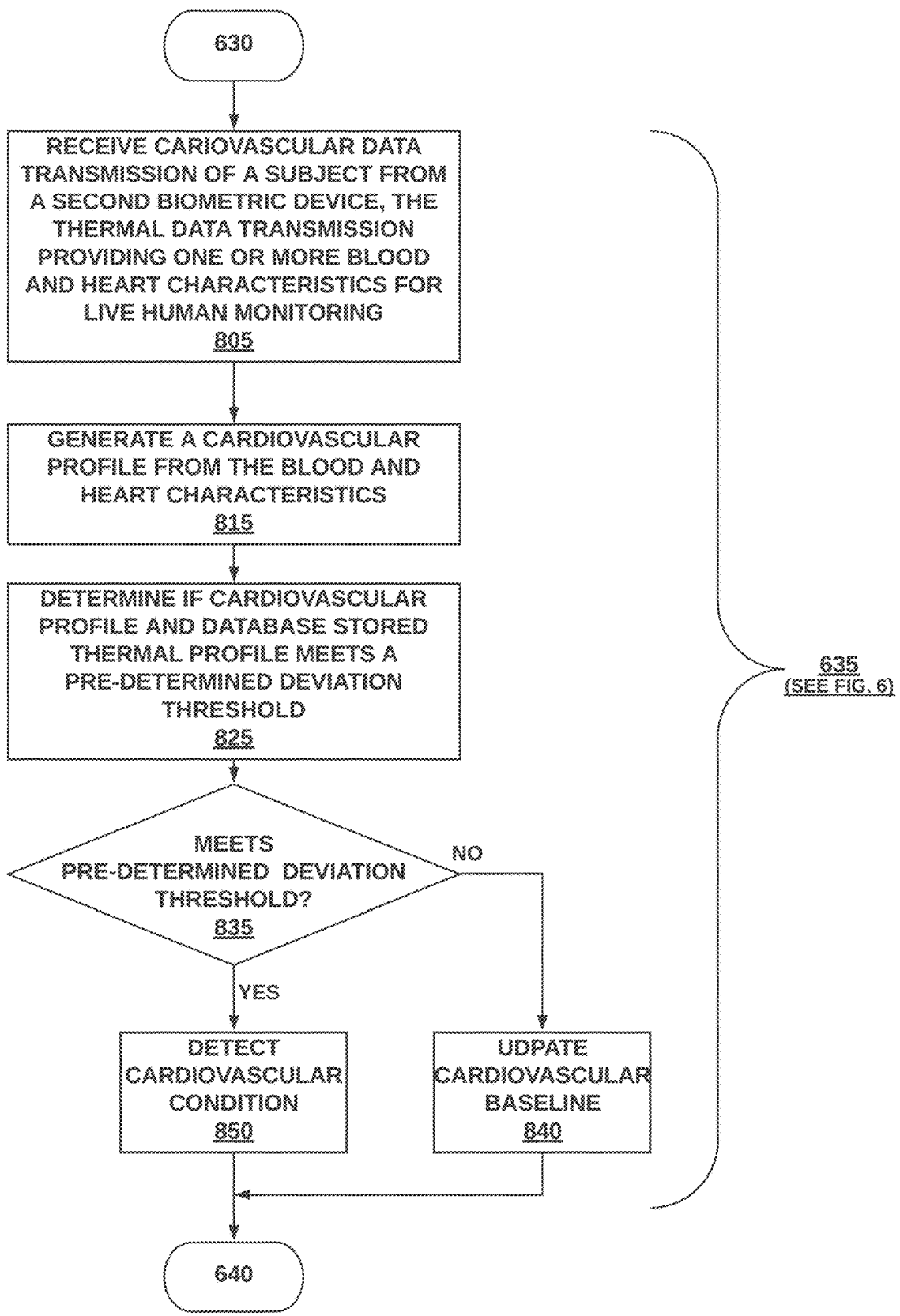
FIG. 8B is a more detailed block diagram illustrating a method for performing biometric monitoring of a subject using a cardiovascular profile (or more general biometric health profile) during biometric authentication, according to one embodiment.

FIG. 8B is a more detailed block diagram illustrating a method for performing biometric monitoring of a subject using a cardiovascular profile, according to one embodiment. At step 800, a thermal data transmission of a subject is received from a second biometric device. The thermal data transmission provides one or more thermal characteristics for live human or live non-human identification. At step 810, a thermal profile is generated from the relative disparities of the thermal characteristics. At step 820, a determination is made as to whether the thermal profile and database stored thermal profile meets a pre-determined threshold of accuracy. In response to meeting a pre-defined threshold at step 830, authentication is deemed successful to the subject at step 840. Otherwise, an indication of unsuccessful authentication is found at step 850.

V. Generic Computing Device (FIG. 9)

Figure 9:
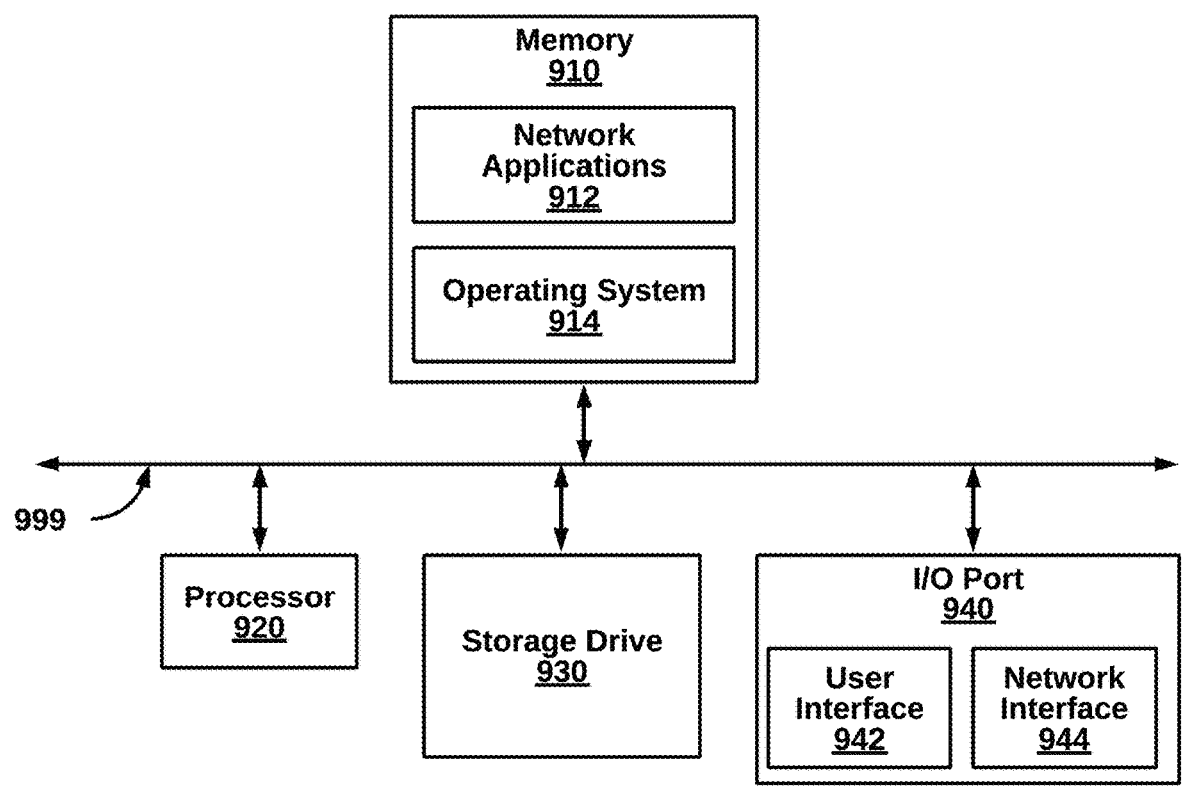
FIG. 9 is a block diagram illustrating an exemplary computing device, according to one embodiment.

FIG. 9 is a block diagram illustrating an example computing device 900 for use in the system 500A of FIG. 5A, according to one embodiment. The computing device 900 is an exemplary device that is implementable for the authentication server 520A. Additionally, the computing device 900 is merely an example implementation itself, since the system 500A can also be fully or partially implemented with laptop computers, tablet computers, smart cell phones, Internet appliances, and the like.

The computing device 900, of the present embodiment, includes a memory 910, a processor 920, a hard drive 930, and an I/O port 940. Each of the components is coupled for electronic communication via a bus 999. Communication can be digital and/or analog, and use any suitable protocol.

The memory 910 further comprises network applications 912 and an operating system 914. The network applications 912 can include a web browser, a mobile application, an application that uses networking, a remote application executing locally, a network protocol application, a network management application, a network routing application, or the like.

The operating system 914 can be one of the Microsoft Windows™ family of operating systems (e.g., Windows 95, 98, Me, Windows NT, Windows 2000, Windows XP, Windows XP x64 Edition, Windows Vista, Windows CE, Windows Mobile), Windows 7, Windows 8, Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 920 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 920 can be single core, multiple core, or include more than one processing elements. The processor 920 can be disposed on silicon or any other suitable material. The processor 920 can receive and execute instructions and data stored in the memory 910 or the storage device 930.

The storage device 930 can be any non-volatile type of storage such as a magnetic disc, EEPROM, Flash, or the like. The storage device 930 stores code and data for applications.

The I/O port 940 further comprises a user interface 942 and a network interface 944. The user interface 942 can output to a display device and receive input from, for example, a keyboard. The network interface 944 connects to a medium such as Ethernet or Wi-Fi for data input and output. In one embodiment, the network interface 944 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use.

We claim:

1. A computer-implemented method for monitoring physical health while granting access to a specific user during biometric authentication over a data communication network, the method comprising:
  receiving an access request from the specific user, wherein access is granted utilizing biometric authentication enhanced with non-invasive internal scanning of the body for characteristics unique to the specific user;
  scanning, with an external light transducer or ultrasound device coupled to an image sensor for scanning internal biometric characteristics of one or more living body parts of the specific user, to generate an anatomical multi-dimensional image internally unique to the specific user and to generate a biometric health profile to encode internal biometric characteristics associated with the heart, flesh and blood of the specific user, responsive to the access request received, wherein the scanning comprises chemosensory data for smell associated with the specific user;
  comparing the chemosensory data and the anatomical multi-dimensional image internal to the specific user to a previously stored chemosensory data and anatomical multi-dimensional images of a plurality of users to determine any match;
  comparing the generated biometric health profile of the specific user to a healthy baseline to determine any health anomaly; and
  granting access to the specific user responsive to matching the anatomical multi-dimensional image internal to the specific user and not identifying any health anomaly.

2. The method of claim 1, further comprising:
  comparing the generated biometric health profile of the specific user to an historical biometric health profile of the specific user to match a known health anomaly of the specific user.

3. The method of claim 1, wherein the step of comparing the biometric health profile comprises:
  comparing the biometric health profile of the specific user to a healthy baseline to determine an infection from internal biometric characteristics associated with SARS, SARS-CoV-2 or COVID-19 markers including at least a reduced hemoglobin level due to lower oxygen levels and an alteration in blood vessel morphology.

4. The method of claim 3, further comprising:
  counting a number of suspected infections; and
  responsive to the counting reaching a predetermined threshold over a window, electronically notifying authorities of a suspected outbreak of SARS, SARS-CoV-2 or COVID-19 infection.

5. The method of claim 1, wherein the healthy baseline represents normal internal biometric characteristics associated with the heart, flesh and blood expected of the specific user.

6. The method of claim 1, wherein the health baseline represents normal internal biometric characteristics associated with the heart, flesh and blood previously scanned from the specific user.

7. The method of claim 1, further comprising:
  performing biometric verification during biometric authentication including:
    determining, from the external light transducer device, light transducer profile generated from light transducer data produced by a light transducer exposing one or more vascular characteristics for human or non-human verification of the specific living user;
    determining if comparing the generated light transducer profile and a database stored light transducer profile, through comparison, meets a pre-determined threshold of accuracy; and
    responsive to a determination that the generated light transducer profile and a database stored generated light transducer profile meets a pre-determined threshold of accuracy and responsive to a determination that the generated health biometric profile and a database stored health biometric profile meeting a pre-determined threshold of accuracy, granting the access request to the specific living user.

8. The method of claim 1, further comprising:
  sending a message indicating authentication is successful to at least one of: the specific user, a display, and a processing component.

9. The method of claim 1, further comprising:
  responsive to identifying a health anomaly, notifying at least one of the specific user, a health administrator and a government official.

10. The method of claim 1 wherein the authentication granted provides for a particular level of permissions associated with a user policy for the specific living user.

11. The method of claim 1, wherein the biometric health profile comprises vascular constriction, heartbeat, blood flow, lactic acid levels, creatine kinase levels, light spectrum, hemoglobin blood oxygen levels, chemosensory levels, and ketones levels of blood and flesh.

12. The method of claim 1, wherein the scanning device operates in an ultrasound frequency or light infrared frequency range.

13. A system to monitor physical health while granting access to a specific user during biometric authentication over a data communication network, the system comprising:
  a locking mechanism to receive an access request from the specific user, wherein access is granted utilizing biometric authentication enhanced with non-invasive internal scanning of the body for characteristics unique to the specific user;
  an external light transducer or ultrasound device coupled with an image sensor for scanning internal biometric characteristics of one or more living body parts of the specific user, to generate an anatomical multi-dimensional image internally unique to the specific user and to generate a biometric health profile to encode internal biometric characteristics associated with the heart, flesh and blood of the specific user, responsive to the access request received, wherein the scanning comprises chemosensory data for smell associated with the specific user;
  a processor to compare the chemosensory data and the anatomical multi-dimensional image internal to the specific user to a previously stored chemosensory data and anatomical multi-dimensional images of a plurality of users to determine any match,
  wherein the processor compares the generated biometric health profile of the specific user to a healthy baseline to determine any health anomaly,
  wherein the processor opens the locking mechanism to grant access to the specific user responsive to matching the anatomical multi-dimensional image internal to the specific user and not identifying any health anomaly.

* * * * *